United States Patent
Reddy et al.

(10) Patent No.: US 11,184,810 B2
(45) Date of Patent: Nov. 23, 2021

(54) ULTRA WIDEBAND RANGE EXTENSION

(71) Applicant: Apple Inc., Cupertino, CA (US)

(72) Inventors: Vusthla Sunil Reddy, San Jose, CA (US); Alejandro J. Marquez, Sunnyvale, CA (US); Indranil S. Sen, Cupertino, CA (US); Manjit S. Walia, San Jose, CA (US); Peter M. Agboh, San Francisco, CA (US); Shang-Te Yang, San Jose, CA (US); Xiaoming Yu, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 79 days.

(21) Appl. No.: 16/540,301

(22) Filed: Aug. 14, 2019

(65) Prior Publication Data

US 2021/0051532 A1 Feb. 18, 2021

(51) Int. Cl.
| | | |
|---|---|---|
| *H04W 36/00* | (2009.01) | |
| *H04W 64/00* | (2009.01) | |
| *H04W 36/30* | (2009.01) | |
| *H04W 76/15* | (2018.01) | |

(52) U.S. Cl.
CPC ... *H04W 36/0027* (2013.01); *H04W 36/0022* (2013.01); *H04W 36/30* (2013.01); *H04W 64/003* (2013.01); *H04W 76/15* (2018.02)

(58) Field of Classification Search
CPC ......... H04W 36/0027; H04W 36/0022; H04W 36/30; H04W 64/003; H04W 36/0066; H04W 76/15–16; H04W 72/1215; H04W 88/06; H01Q 5/21; H01Q 5/00
See application file for complete search history.

(56) References Cited

U.S. PATENT DOCUMENTS

| | | | |
|---|---|---|---|
| 8,184,656 B2 | 5/2012 | Chandra et al. | |
| 8,406,691 B2 | 3/2013 | Bogestam et al. | |
| 2012/0009875 A1* | 1/2012 | Miettinen | A61B 5/0006 |
| | | | 455/41.2 |
| 2014/0253388 A1* | 9/2014 | Jalali | G01S 5/14 |
| | | | 342/458 |
| 2015/0016488 A1* | 1/2015 | McLaughlin | H04B 1/719 |
| | | | 375/130 |
| 2016/0048710 A1 | 2/2016 | Nekoogar et al. | |

(Continued)

*Primary Examiner* — Chi H Pham
*Assistant Examiner* — Ji-Hae Yea
(74) *Attorney, Agent, or Firm* — Kowert, Hood, Munyon, Rankin & Goetzel. P.C.

(57) ABSTRACT

Methods and apparatuses are presented to locate a wireless communication device. A target device may be out of range of a source device for normal ranging communications according to a first radio access technology (RAT), such as ultra wideband (UWB) communications. A source device may therefore modify communications according to the first RAT, to increase the transmit power, while removing the data payload. The target device may utilize the signal strength and angle of arrival of the modified communications to guide the user to move toward the source device, e.g., until the target device is within range to perform normal ranging communications. A second RAT, such as Bluetooth, may be used to communicate between the two devices while the target device is out of range of the first RAT. For example, the target device may use the second RAT to communicate to the source device to start/stop transmitting modified communications.

20 Claims, 4 Drawing Sheets

(56) References Cited

U.S. PATENT DOCUMENTS

2016/0323863 A1* 11/2016 Park ............... H04W 4/70
2018/0099643 A1* 4/2018 Golsch ............ A61B 5/0006
                                              455/41.2

* cited by examiner

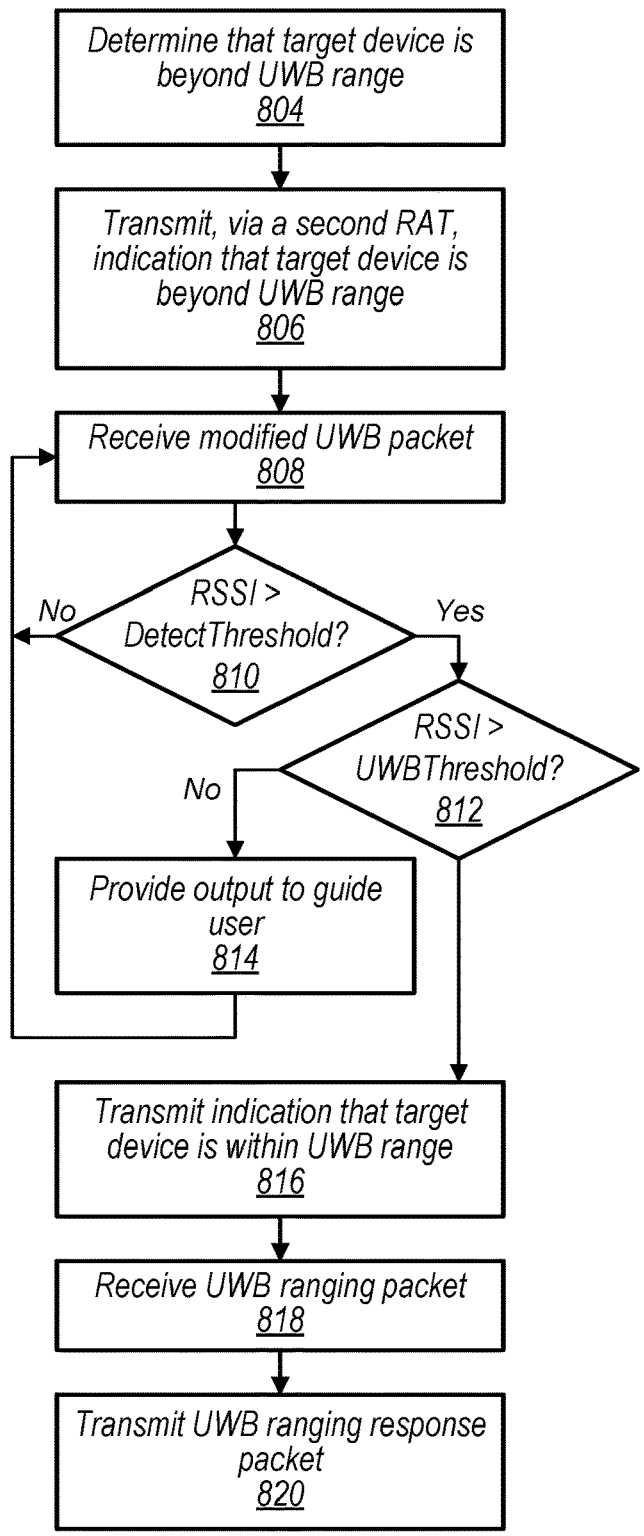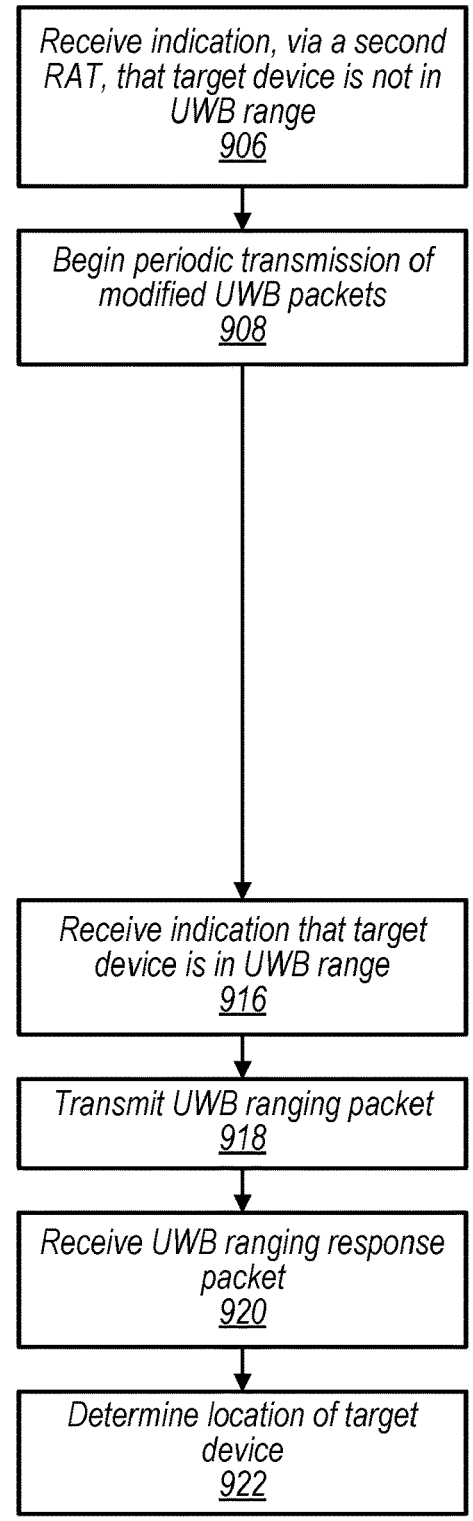
FIG. 8
FIG. 9

ULTRA WIDEBAND RANGE EXTENSION

TECHNICAL FIELD

The present application relates to wireless communication, including to techniques for extending ranging distance for wireless communication.

DESCRIPTION OF THE RELATED ART

Wireless communication systems are rapidly growing in usage. Further, wireless communication technology has evolved from voice-only communications to also include the transmission of data, such as Internet and multimedia content.

Mobile electronic devices may take the form of smart phones or tablets that a user typically carries. Wearable devices (also referred to as accessory devices) are a newer form of mobile electronic device, one example being smart watches. Additionally, low-cost low-complexity wireless devices intended for stationary or nomadic deployment are also proliferating as part of the developing "Internet of Things". In other words, there is an increasingly wide range of desired device complexities, capabilities, traffic patterns, and other characteristics.

One use case for wireless communication includes ranging communication. Ranging may be performed through time-of-arrival measurements, in combination with message exchanges to extract time-of-flight and/or angle of arrival. In particular, ultra wideband (UWB) devices may be used to perform accurate ranging. However, UWB communications have a shorter functional range than other radio access technologies. Extending the range of UWB ranging communications would be beneficial.

Accordingly, improvements in the field are desired.

SUMMARY

Embodiments are presented herein of, inter alia, systems, apparatuses, and methods for locating a wireless communication device that is located beyond the functional range of traditional ranging procedures.

According to the techniques described herein, extended ranging techniques can be performed using a first radio access technology (RAT), such as ultra wideband (UWB) communications, in conjunction with a second RAT, such as Bluetooth.

A method is presented for locating a remote device. A wireless communication device may receive from a source device a first packet according to a first radios access technology (RAT), the first packet having a first configuration. The wireless communication device may determine determining that a received signal quality of the first packet meets a predetermined threshold. In response to the determining, the wireless communication device may transmit, according to a second RAT, an indication that the wireless communication device is within normal communication range of the source device according to the first RAT. The wireless communication device may receive from the source device a second packet, responsive to the indication that the wireless communication device is within normal communication range of the source device. The second packet may have a second configuration, different from the first configuration, wherein a packet preamble configured according to the second configuration has a lower power level than a preamble configured according to the first configuration.

In some scenarios, the second packet may be a ranging packet. The wireless communication device may transmit a ranging response message in response to the second packet.

In some scenarios, the wireless communication device may receive a third packet, prior to receiving the first packet, the third packet having the first configuration. In response to receiving the third packet, the wireless communication device may provide an output indicating an estimated location of the source device. The output may indicate at least one of an estimated direction or an estimated distance from the wireless communication device to the source device. In some scenarios, the wireless communication device may determine an angle of arrival of the third packet, wherein the estimated direction indicated by the output may be based on the determined angle of arrival. In some scenarios, the wireless communication device may receive from the source device a plurality of packets according to the first RAT, each packet of the plurality of packets having the first configuration; and may provide an updated output indicating an estimated location of the source device, in response to each packet of the plurality of packets.

In some scenarios, the first configuration may comprise at least a preamble of a packet being encoded with a spreading code. In some scenarios, the wireless communication device may receive, via the second RAT, code information regarding the spreading code.

In some scenarios, the wireless communication device may receive, via the second RAT, timing information indicating when packets having the first configuration will be transmitted. The wireless communication device may listen for the packets having the first configuration at one or more times based on the timing information, wherein a receiver for receiving signals according to the first RAT is disabled at other times.

A wireless communication device is presented for locating a target device. The wireless communication device may transmit a first packet according to a first radio access technology (RAT), the first packet having a first configuration including a preamble having a first energy level. The wireless communication device may receive an indication via a second RAT that the target device is within normal communication range according to the first RAT. The wireless communication device may transmit a second packet according to the first RAT, in response to receiving the indication, the second packet having a second configuration including a preamble having a second energy level, lower than the first energy level. The wireless communication device may receive a ranging response message responsive to the second packet, and may determine a distance between the wireless communication device and the target device, based on the received ranging response message.

In some scenarios, the wireless communication device may provide the location to the target device.

In some scenarios, the second packet may include a data payload portion, wherein the first packet omits the data payload portion. In some scenarios, the first packet may consist of a preamble and a start frame delimiter.

In some scenarios, the second energy level may be lower than the first energy level as a result of the first preamble having higher instantaneous transmit power than the second preamble. In some scenarios, the second energy level may be lower than the first energy level as a result of the first preamble having a longer time duration than the second preamble.

In some scenarios, transmitting the first packet having the first configuration may be in response to receiving an indication via the second RAT that the target device is outside normal communication range of the first RAT.

Apparatuses and systems are presented to implement any of the preceding methods.

This summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

FIG. 8 illustrates an example flow diagram of a method for locating a wireless communication device using multiple RATs, implemented by a target device, according to some embodiments.

FIG. 9 illustrates an example flow diagram of a method for locating a wireless communication device using multiple RATs, implemented by a source device, according to some embodiments.

Figure 1:
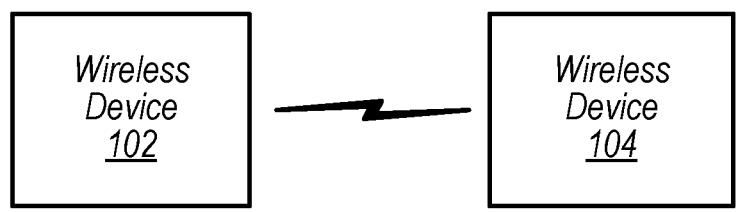
FIG. 1 illustrates an example wireless communication system, according to various exemplary embodiments described herein.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Incorporation by Reference

Various details of example UWB communication protocols are disclosed in IEEE 802.15.4-2015, which is hereby incorporated by reference as though disclosed herein in its entirety.

Terminology

The following are definitions of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™ PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer system devices which performs wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" (also called "eNB" or "gNB") has the full breadth of its ordinary meaning, and at least includes a wireless communication station installed at a fixed location and used to communicate as part of a wireless cellular communication system.

Link Budget Limited—includes the full breadth of its ordinary meaning, and at least includes a characteristic of a wireless device (e.g., a UE) which exhibits limited communication capabilities, or limited power, relative to a device that is not link budget limited, or relative to devices for which a radio access technology (RAT) standard has been developed. A wireless device that is link budget limited may experience relatively limited reception and/or transmission capabilities, which may be due to one or more factors such as device design, device size, battery size, antenna size or design, transmit power, receive power, current transmission medium conditions, and/or other factors. Such devices may be referred to herein as "link budget limited" (or "link budget constrained") devices. A device may be inherently link budget limited due to its size, battery power, and/or transmit/receive power. For example, a smart watch that is communicating over LTE or LTE-A with a base station may be inherently link budget limited due to its reduced transmit/receive power and/or reduced antenna. Wearable devices, such as smart watches, are generally link budget limited devices. Alternatively, a device may not be inherently link budget limited, e.g., may have sufficient size, battery power, and/or transmit/receive power for normal communications over LTE or LTE-A, but may be temporarily link budget limited due to current communication conditions, e.g., a smart phone being at the edge of a cell, etc. It is noted that the term "link budget limited" includes or encompasses power limitations, and thus a power limited device may be considered a link budget limited device.

Processing Element (or Processor)—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

As described below, aspects of the present technology may include the gathering and use of data available from various sources, e.g., to improve or enhance functionality. The present disclosure contemplates that in some instances, this gathered data may include personal information data that uniquely identifies or can be used to contact or locate a specific person. Such personal information data can include location-based data, as well as other data, such as demographic data, telephone numbers, email addresses, Twitter ID's, home addresses, data or records relating to a user's health or level of fitness (e.g., vital signs measurements, medication information, exercise information), date of birth, or any other identifying or personal information. The present disclosure recognizes that the use of such personal information data, in the present technology, may be used to the benefit of users.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology may be configurable to allow users to selectively "opt in" or "opt out" of participation in the collection of personal information data, e.g., during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

FIG. 1—Wireless Communication System

FIG. 1 illustrates an exemplary (and simplified) wireless communication system 100 in which aspects of this disclosure may be implemented. It is noted that the system of FIG. 1 is merely one example of a possible system, and embodiments of this disclosure may be implemented in any of various systems, as desired.

As shown, the exemplary wireless communication system includes a ("first") wireless device 102 in communication with another ("second") wireless device 104. The first wireless device 102 and the second wireless device 104 may communicate wirelessly using any of a variety of wireless communication techniques, potentially including secure ranging wireless communication techniques.

As one possibility, the first wireless device 102 and the second wireless device 104 may perform secure ranging using ultra wideband (UWB) communication technology (e.g., IEEE 802.15.4 WPAN communication) and/or other techniques based on WPAN or WLAN wireless communication. One or both of the wireless device 102 and the wireless device 104 may also be capable of communicating via one or more additional wireless communication protocols, such as any of Bluetooth (BT), Bluetooth Low Energy (BLE), WLAN (e.g., IEEE 802.11/Wi-Fi), near field communication (NFC), GSM, UMTS (WCDMA, TDSCDMA), LTE, LTE-Advanced (LTE-A), NR, 3GPP2 CDMA2000 (e.g., 1×RTT, 1×EV-DO, HRPD, eHRPD), Wi-MAX, GPS, etc.

The wireless devices 102, 104 may be any of a variety of types of wireless device. As one possibility, one or more of the wireless devices 102, 104 may be a substantially portable wireless user equipment (UE) device, such as a smart phone, hand-held device, a wearable device, a tablet, a motor vehicle, or virtually any type of mobile wireless device. As another possibility, one or more of the wireless devices 102, 104 may be a substantially stationary device, such as a set top box, media player (e.g., an audio or audiovisual device), gaming console, desktop computer, appliance, environmental controller, door, or any of a variety of other types of device.

Each of the wireless devices 102, 104 may include wireless communication circuitry configured to facilitate the performance of wireless communication, which may include various digital and/or analog radio frequency (RF) components, a processor that is configured to execute program instructions stored in memory, a programmable hardware element such as a field-programmable gate array (FPGA), and/or any of various other components. The wireless device 102 and/or the wireless device 104 may perform any of the method embodiments described herein, or any portion of any of the method embodiments described herein, using any or all of such components.

Each of the wireless devices 102, 104 may include one or more antennas for communicating using one or more wireless communication protocols. In some cases, one or more parts of a receive and/or transmit chain may be shared between multiple wireless communication standards. For example, a device might be configured to communicate using either of Bluetooth or UWB using partially or entirely shared wireless communication circuitry (e.g., using a shared radio or at least shared radio components). The shared communication circuitry may include a single antenna, or may include multiple antennas (e.g., for MIMO) for performing wireless communications. Alternatively, a device may include separate transmit and/or receive chains (e.g., including separate antennas and other radio components) for each wireless communication protocol with which it is configured to communicate. As a further possibility, a device may include one or more radios or radio components which are shared between multiple wireless communication protocols, and one or more radios or radio components which are used exclusively by a single wireless communication protocol. For example, a device might include a shared radio for communicating using either of LTE or CDMA2000 1×RTT, and separate radios for communicating using each of UWB, Wi-Fi, and/or Bluetooth. Other configurations are also possible.

As previously noted, aspects of this disclosure may be implemented in conjunction with the wireless communication system of FIG. 1. For example, the wireless devices 102, 104 may communicate using one or more ranging techniques or features described subsequently herein with respect to FIGS. 4-9. By utilizing such techniques (and/or other techniques described herein), the wireless device(s) may (at least according to some embodiments) be able to achieve extended ranging communication.

Figure 2:
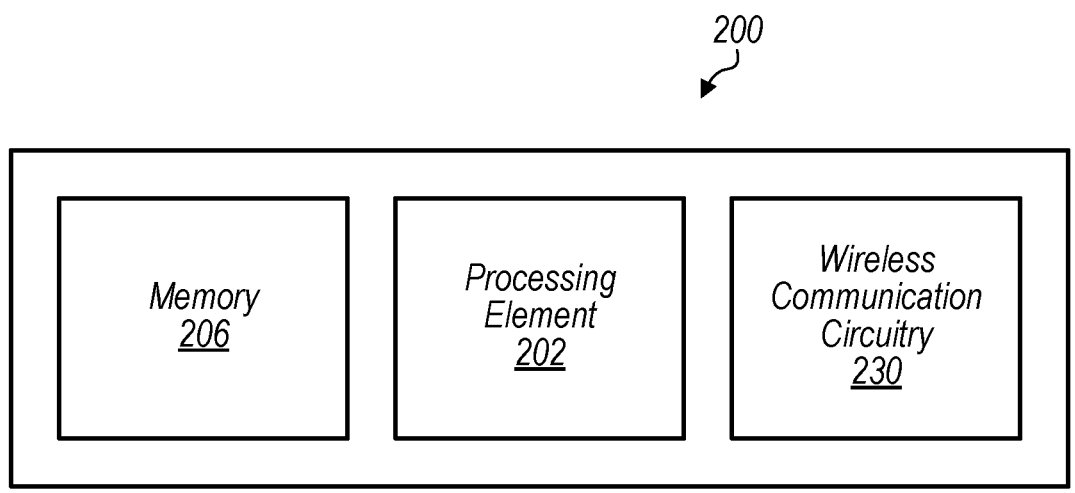
FIGS. 2-3 are block diagrams illustrating example wireless devices, according to various exemplary embodiments described herein.
Figure 3:
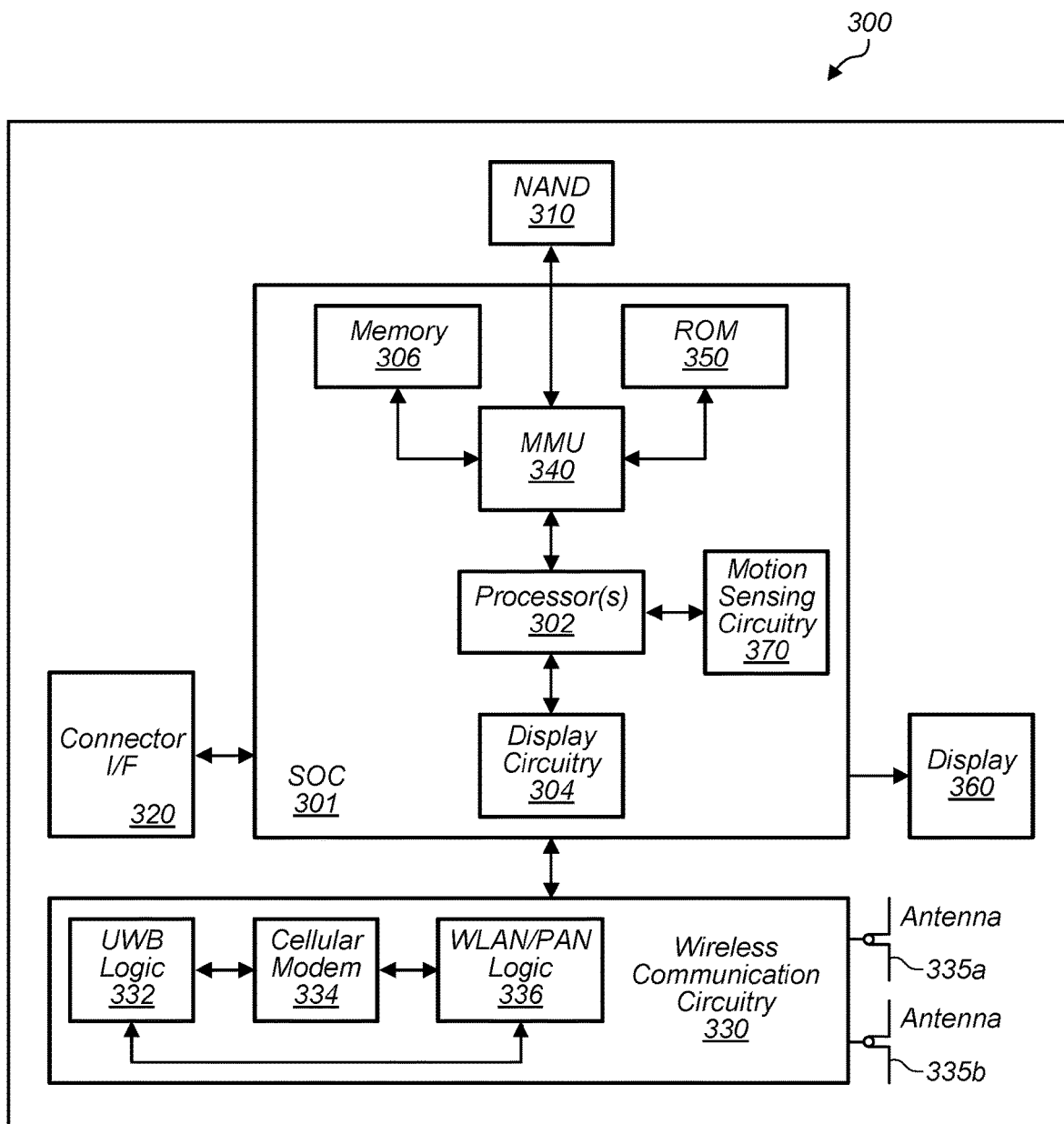

FIGS. 2-3—Exemplary Device Block Diagrams

FIG. 2 illustrates an exemplary wireless device 200 that may be configured for use in conjunction with various aspects of the present disclosure. For example, the device 200 may be an example of the wireless device 102 or the wireless device 104. The device 200 may be any of a variety of types of device and may be configured to perform any of a variety of types of functionality. The device 200 may be a substantially portable device or may be a substantially stationary device, potentially including any of a variety of types of device. The device 200 may be configured to perform one or more ranging techniques or features, such as any of the techniques or features illustrated and/or described subsequently herein with respect to any or all of FIGS. 4-9.

As shown, the device 200 may include a processing element 202. The processing element may include or be coupled to one or more memory elements. For example, the device 200 may include one or more memory media (e.g., memory 206), which may include any of a variety of types of memory and may serve any of a variety of functions. For example, memory 206 could be RAM serving as a system memory for processing element 202. Other types and functions are also possible.

Additionally, the device 200 may include wireless communication circuitry 230. The wireless communication circuitry may include any of a variety of communication elements (e.g., antenna for wireless communication, analog and/or digital communication circuitry/controllers, etc.) and may enable the device to wirelessly communicate using one or more wireless communication protocols.

Note that in some cases, the wireless communication circuitry 230 may include its own processing element (e.g., a baseband processor), e.g., in addition to the processing element 202. For example, the processing element 202 might be (or include) an 'application processor' whose primary function may be to support application layer operations in the device 200, while the wireless communication circuitry 230 might include a 'baseband processor' whose primary function may be to support baseband layer operations (e.g., to facilitate wireless communication between the device 200 and other devices) in the device 200. In other words, in some cases the device 200 may include multiple processing elements (e.g., may be a multi-processor device). Other configurations (e.g., instead of or in addition to an application processor/baseband processor configuration) utilizing a multi-processor architecture are also possible.

The device 200 may additionally include any of a variety of other components (not shown) for implementing device functionality, depending on the intended functionality of the device 200, which may include further processing and/or memory elements (e.g., audio processing circuitry), one or more power supply elements (which may rely on battery power and/or an external power source) user interface elements (e.g., display, speaker, microphone, camera, keyboard, mouse, touchscreen, etc.), and/or any of various other components.

The components of the device 200, such as processing element 202, memory 206, and wireless communication circuitry 230, may be operatively coupled via one or more interconnection interfaces, which may include any of a variety of types of interface, possibly including a combination of multiple types of interface. As one example, a USB high-speed inter-chip (HSIC) interface may be provided for inter-chip communications between processing elements. Alternatively (or in addition), a universal asynchronous receiver transmitter (UART) interface, a serial peripheral interface (SPI), inter-integrated circuit (I2C), system management bus (SMBus), and/or any of a variety of other communication interfaces may be used for communications between various device components. Other types of interfaces (e.g., intra-chip interfaces for communication within processing element 202, peripheral interfaces for communication with peripheral components within or external to device 200, etc.) may also be provided as part of device 200.

FIG. 3 illustrates one possible block diagram of a wireless device 300, which may be one possible exemplary implementation of the device 200 illustrated in FIG. 2. As shown, the wireless device 300 may include a system on chip (SOC) 301, which may include portions for various purposes. For example, as shown, the SOC 301 may include processor(s) 302 which may execute program instructions for the wireless device 300, and display circuitry 304 which may perform graphics processing and provide display signals to the display 360. The SOC 301 may also include motion sensing circuitry 370 which may detect motion of the wireless device 300, for example using a gyroscope, accelerometer, and/or any of various other motion sensing components. The processor(s) 302 may also be coupled to memory management unit (MMU) 340, which may be configured to receive addresses from the processor(s) 302 and translate those addresses to locations in memory (e.g., memory 306, read only memory (ROM) 350, flash memory 310). The MMU 340 may be configured to perform memory protection and page table translation or set up. In some embodiments, the MMU 340 may be included as a portion of the processor(s) 302.

As shown, the SOC 301 may be coupled to various other circuits of the wireless device 300. For example, the wireless device 300 may include various types of memory (e.g., including NAND flash 310), a connector interface 320 (e.g., for coupling to a computer system, dock, charging station, etc.), the display 360, and wireless communication circuitry 330 (e.g., for UWB, LTE, LTE-A, CDMA2000, Bluetooth, Wi-Fi, NFC, GPS, etc.).

The wireless device 300 may include at least one antenna, and in some embodiments multiple antennas 335a and 335b, for performing wireless communication with base stations and/or other devices. For example, the wireless device 300 may use antennas 335a and 335b to perform the wireless communication. As noted above, the wireless device 300 may in some embodiments be configured to communicate wirelessly using a plurality of wireless communication standards or radio access technologies (RATs).

The wireless communication circuitry 330 may include UWB Logic 332, a Cellular Modem 334, and additional WLAN/PAN Logic 336. The UWB Logic 332 is for enabling the wireless device 300 to perform UWB communications and/or for ranging communications, e.g., according to 802.15.4 protocols. The WLAN/PAN Logic 336 is for enabling the wireless device 300 to perform other WLAN and/or PAN communications, such as Wi-Fi and/or Bluetooth communications. The cellular modem 334 may be capable of performing cellular communication according to one or more cellular communication technologies.

As described herein, wireless device 300 may include hardware and software components for implementing embodiments of this disclosure. For example, one or more components of the wireless communication circuitry 330 (e.g., UWB Logic 332) of the wireless device 300 may be configured to implement part or all of the methods described herein, e.g., by a processor executing program instructions stored on a memory medium (e.g., a non-transitory computer-readable memory medium), a processor configured as an FPGA (Field Programmable Gate Array), and/or using dedicated hardware components, which may include an ASIC (Application Specific Integrated Circuit).

FIG. 4—Ranging

Wireless ranging techniques allow a wireless device, such as the wireless device 102, to locate another wireless device, such as the wireless device 104, e.g., by determining a relative distance and direction of the other wireless device. For example, in some scenarios, a source wireless device, such as the wireless device 102, may transmit a ranging request message, such as a ranging packet. The ranging request message may be received by a target device, such as the wireless device 104. In response, the target device may transmit a ranging response message, e.g., at a known time delay following receipt of the ranging request message. The source device may receive the ranging response message, and determine a time of flight based on the time the ranging request message was sent and the time the ranging response message was received. A distance between the source device and the target device may be calculated based on the time of flight. In some scenarios, the source device may also determine an angle of arrival of the ranging response message, which may be used to determine the direction of the target device relative to the source device. Other ranging procedures are also possible. Examples of particular ranging procedures are defined in greater detail by IEEE 802.15.4-2015, which was incorporated by reference above.

Ranging may be performed using any of a variety of RATs, and some devices may be capable of performing ranging using any of multiple RATs. For example, a wireless device may be capable of performing ranging using a BT radio, and may also be capable of performing ranging using an UWB radio, or other RAT.

A particular RAT may be selected for a ranging operation, e.g., based on the performance characteristics of that RAT. For example, BT communications (and thus BT ranging) may have a greater effective range than UWB communications (and thus UWB ranging), e.g., due to low transmit power of UWB communications. For example, some implementations of BT may have a functional communication range of approximately 100 feet, if a line-of-sight path is available, or a smaller range (e.g., 20-30 feet) if no line-of-sight is available. By contrast, some implementations of UWB may have a functional communication range of approximately 40 feet, if a line-of-sight path is available, or a smaller range (e.g., 4-5 feet) if no line-of-sight is available.

Figure 4:
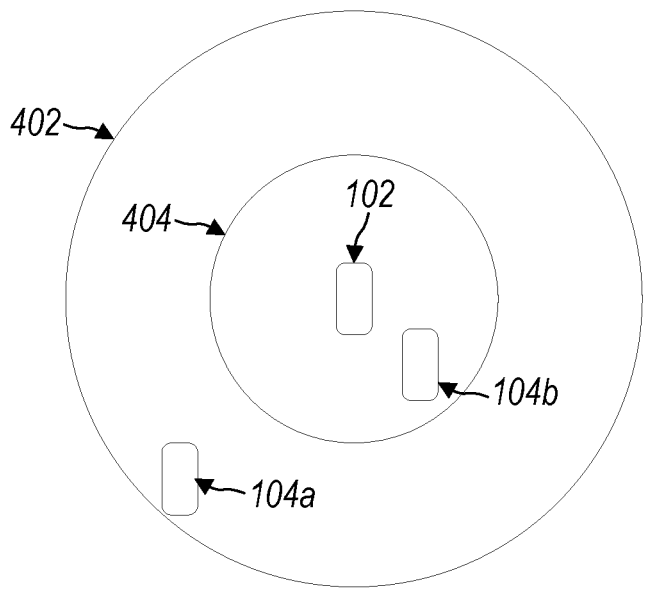
FIG. 4 illustrates an example of the functional ranges of two radio access technologies supported by a wireless device, according to some embodiments.

FIG. 4 illustrates an example of the wireless device 102, in an implementation capable of performing communications according to two RATs, according to some embodiments. As illustrated, a first RAT (e.g., BT) may have a functional range 402. Thus, the wireless device 102 may be capable of performing communications (e.g., exchanging ranging messages) according to the first RAT with a wireless device 104 within the range 402, such as either of the wireless device 104a or the wireless device 104b.

As illustrated, a second RAT (e.g., UWB) may have a smaller functional range 404. Thus, the wireless device 102 may be capable of performing communications according to the second RAT with a wireless device 104 only within the range 404. For example, the wireless device 102 may be capable of communicating according to the second RAT with the wireless device 104b, but not with the wireless device 104a.

As another example, UWB ranging may determine a more precise and/or more accurate location than BT ranging. E.g., the wide bandwidth of UWB communications may allow for more precise and/or accurate measurement of arrival time of ranging messages, resulting in a more precise/accurate measurement of the distance of the transmitting device. Further, one or more antenna(s) used for UWB communications may, in some implementations, have greater directionality than one or more antenna(s) used for BT communications, which may result in more precise and/or accurate measurement of angle of arrival of a ranging message, resulting in a more precise/accurate measurement of direction of the transmitting device.

It should be understood that FIG. 4 is merely an illustration, and is not intended to be limiting. For example, the relative distances may not be illustrated to scale. As another example, one or more of the range 402 and the range 404 may be highly directional (rather than omnidirectional, as illustrated), such that the range may vary based on the angle relative to the wireless device 102.

It may be seen from the preceding discussion that, in scenarios in which precise ranging is desired, UWB ranging may be preferred over BT ranging, but UWB ranging may be limited by its shorter functional range. It is therefore desirable to increase the functional range of UWB ranging. It may also be desirable to assist a user in bringing a wireless device within the functional range of a source device for UWB ranging, to allow more precise location of the source device.

Figure 5:
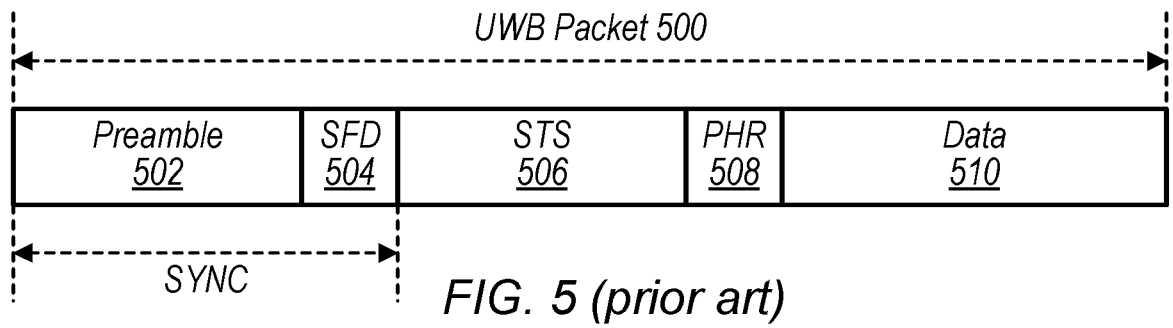
FIG. 5 illustrates a traditional UWB packet, according to some embodiments.
Figure 6:
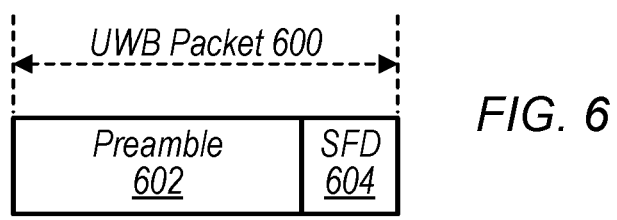
FIGS. 6-7 shows two examples of modified UWB packets, according to various exemplary embodiments described herein.
Figure 7:
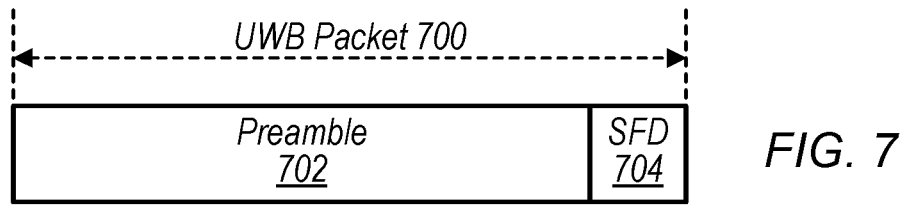

FIGS. 5-7—Increasing Functional Range

The functional range of UWB packets (or packets of other RATs) in ranging operations may be increased by altering the packet format.

FIG. 5 illustrates a traditional UWB packet 500, according to some embodiments. As illustrated, the UWB packet 500 may include a preamble 502, a start-of-frame delimiter (SFD) 504, a secure training sequence (STS) 506, a physical layer header (PHR) 508, and a data field 510.

The preamble 502 and the SFD 504 may be used for detection and synchronization of the UWB packet 500. For example, the preamble 502 may include a predefined pattern to allow a receiving wireless device to recognize the presence of an UWB packet, while sampling at a relatively low rate. The preamble 502 may have a duration of, e.g., 64 us. The SFD 504 may include a predefined pattern, with a clearly identifiable point of termination. The SFD 504 may have a shorter duration, e.g., 8us. In response to detecting the preamble 504, the receiving wireless device may begin sampling at a higher rate, to precisely locate the point of termination of the SFD 504. The receiving wireless device may base the timing of subsequent sampling of the UWB packet 500 on the point of termination of the SFD 504, thus synchronizing reception of the UWB packet 500.

The STS 506 may be used for channel estimation, gain control, security, etc. The STS 506 may have a duration of, e.g., 64 us. The PHR 508 may include header information regarding physical layer parameters of the UWB packet 500 and/or the data field 510, and may have a duration of, e.g., 22 us. The PHR 508 may also include an indication (e.g., a flag bit) that the UWB packet 500 is a ranging packet. In response to detecting an indication that the UWB packet 500 is a ranging packet, the receiving wireless device (e.g., the target device) may respond according to an established ranging procedure, such as by transmitting a ranging response message. In some scenarios, the receiving wireless device may report the time of the start of the PHR 508 as the time of reception of the UWB packet 500, e.g., for purposes of time-of-flight estimation in a ranging procedure.

The data field 510 may include payload data, and may have a duration of variable size, e.g., based on the payload size.

The functional range of the UWB packet 500 may often be dictated by the data field 510, e.g., because the data field 510 must be received with sufficient accuracy to allow correct decoding. For example, the preamble 502, the SFD 504, and/or the STS 506 may often be received with sufficient accuracy to be functional at distances beyond that at which the data field 510 can be accurately decoded. Said another way, a received signal may have sufficient signal quality to allow proper use of, e.g., the preamble 502, the SFD 504, and the STS 506, but may have insufficient signal quality to allow accurate decoding of the data field 510.

However, a packet transmitted for ranging purposes may be at least partially effective without decoding the payload. Thus, to conserve power, in some scenarios a modified packet may be transmitted (e.g., by the source device) with the payload omitted, e.g., without the data field 510. In some scenarios, the modified packet may also omit the STS and/or the PHR, as these fields may function primarily to support reception of the omitted data field. In other scenarios, the STS and/or the PHR may be included, despite the omission of the data field, e.g., such that the packet includes an indication in the PHR that the packet is a ranging packet.

FIG. 6 illustrates an example of a modified UWB packet 600, with the STS, PHR, and data fields omitted, according to some embodiments. The UWB packet 600 may include a preamble 602 and a SFD 604. In some scenarios, the preamble 602 may be substantially similar or identical to the preamble 502, and the SFD 604 may be substantially similar or identical to the SFD 504.

In some scenarios, the transmitting wireless device (e.g., source device) may increase the instantaneous transmit power of the preamble 602 beyond the instantaneous transmit power of the traditional preamble 502. For example, the transmit power of the preamble 602 may be doubled (e.g., increased by 3 dB) relative to the traditional preamble 502. This may increase the functional range of the UWB packet 600 by a 5 dB additional link margin. However, this solution may also increase the risk of out-of-channel emissions, and may involve redesigned transmitter hardware to support the increased transmit power, to reduce out-of-channel emissions, etc. In some scenarios, the instantaneous transmit power of the preamble 602 could be increased by some other amount.

FIG. 7 illustrates an example of a modified UWB packet 700, with the STS, PHR, and data fields omitted, according to some embodiments. The UWB packet 700 may include a preamble 702 and a SFD 704. In some scenarios, the preamble 702 may be substantially similar or identical to the preamble 502, and the SFD 704 may be substantially similar or identical to the SFD 504.

In some scenarios, the transmitting wireless device (e.g., source device) may increase the length of the preamble 702 beyond the length of the traditional preamble 502, e.g., while maintaining the same instantaneous transmit power as the traditional preamble 502. For example, the length of the preamble 702 may be doubled (e.g., 128 us) relative to the traditional preamble 502. This may increase the functional range of the UWB packet 700 by a 5 dB additional link margin, by increasing the total transmitted power of the preamble over time. In some scenarios, the length of the preamble 702 could be increased even further. Increasing the length of the preamble 702 may increase the functional range of the UWB packet 700 without significantly increasing the risk of out-of-channel emissions, and without significant changes to the transmitter. Because the STS, PHR, and data field are omitted from the UWB packet 700, the UWB packet 700 may remain significantly shorter than the traditional UWB packet 500, despite the increase in length of the preamble 700.

Coordination of Multiple RATs

In some scenarios, a wireless device may assist a user in bringing a wireless device within the functional range of a source device for UWB ranging, by coordinating UWB communications with communications of another RAT, such as BT. For example, as noted above, BT may have a longer functional range than UWB, but BT ranging may be less accurate/precise. For example, BT communications may be omnidirectional, which may prevent the BT radio of a receiving wireless device (e.g., target device) from identifying the direction from which a BT ranging signal is received. Thus, in some scenarios, BT ranging techniques may provide only a distance between the source device and the target device, and not a direction. In other scenarios, BT ranging techniques may provide a direction that is insufficiently accurate/precise.

Modifying an UWB packet, e.g., as illustrated in FIG. 6 or FIG. 7, may extend the detectable range of the UWB packet, e.g., to nearly the functional range of BT communications. However, such a modified UWB packet may not support payload communications, e.g., because the payload field is omitted, and may also not fully support traditional UWB ranging procedures, e.g., because the PHR is omitted. It may be possible, though, for a receiving wireless device (e.g., target device) to determine approximate information regarding the relative location of the transmitting wireless device (e.g., source device) based on a received modified UWB packet. For example, the receiving wireless device may determine the angle of arrival of the received UWB packet, and thus the direction of the transmitting wireless device. The receiving wireless device may also estimate an approximate range of the transmitting wireless device based, e.g., on the signal strength of the received UWB packet. In some scenarios, such modified ranging estimate procedures may be facilitated by utilizing a second RAT, such as BT.

FIG. 8 illustrates an example flow diagram of a method for locating a wireless communication device using multiple RATs, according to some embodiments. The method of FIG. 8 may be performed by a wireless communication device, such as the wireless device 104 of FIG. 1, acting as a target device. FIG. 9 illustrates a corresponding example flow diagram of a method for locating a wireless communication device using multiple RATs, according to some embodiments, wherein the method may be performed by a wireless communication device, such as the wireless device 102, acting as a source device. In some scenarios, the two illustrated methods may be performed in parallel.

In the scenarios of FIG. 8 and FIG. 9, a target device may be seeking the relative location of a source device. For example, the target device and the source device may be smartphones belonging to different users, wherein the user of target device may be attempting to locate the user of the source device, e.g., in a crowded area. As another example, the target device may be a smartphone, and the source device may be a dedicated locational device (e.g., a dongle, fob, etc.), which may be affixed to an item such as luggage, a keychain, etc., to facilitate finding the item. As another example, the target device may be a mobile computing device (e.g., smartphone, smart watch, tablet computer) capable of communicating with the source device by UWB communications with a narrow beamwidth, wherein the user of the target device may need to aim the target device directly at the source device to ensure that the source device is within the UWB communication beam.

In any of these scenarios, among many others, the user may benefit from being guided to the source device. In some scenarios, this process may be initiated by a user identifying the source device to be found (e.g., by identifying the source device directly, or a user associated with the source device) or a function to be performed (the function being associated with the source device). In other scenarios, the process may be initiated by determining that an eligible source device is in the vicinity of the target device (e.g., via BT ranging; by detecting that the target device is within BT communication range of the source device; by determining that the target device has entered an area in which an eligible source device is known to be located; etc.).

As illustrated in FIG. 8, the target device may, at 804, determine that the target device is beyond the functional range of UWB communications with a source device. For example, the target device may use BT ranging or other known methods to determine an approximate location of, or distance to, the source device. As another example, the target device may fail to receive expected UWB communications, such as ranging request messages or periodic beacons, from the source device.

In response to determining that the target device is beyond the functional range of UWB communications with the source device, the target device may, at 806, transmit to the source device an indication that the target device is beyond the functional range of UWB communications with the source device. In some scenarios, the transmission at 806 may additionally, or alternatively, include an instruction, request, or other indication for the source device to begin transmitting modified UWB packets. In some scenarios, such an instruction or request may be interpreted as an indication that the target device is beyond the functional range of UWB communications with the source device, or vice versa. Because the target device is beyond the functional range of UWB communications with the source device, the indication may be transmitted via a second RAT. For example, the indication may be transmitted via a BT connection between the target device and the source device. As another example, the indication may be transmitted via Wi-Fi or cellular communications (either peer-to-peer or via a network). The second RAT may be any available RAT that allows communications from the target device to the source device at their current range (which is beyond the functional range of UWB communications). However, in some scenarios, a low-power RAT, such as BT or BLE, may be selected, e.g., to reduce power consumption of the ranging process.

As illustrated in FIG. 9, the source device may, at 906, receive, via the second RAT, the indication that the target device is beyond the functional range of UWB communications with the source device. In response, the source device may, at 908, initiate transmission of UWB packets that are modified to have a greater-than-normal range. For example, the UWB packets may be modified as discussed above in connection with either of FIG. 6 or FIG. 7. According to various examples, such as those of FIG. 6 or FIG. 7, among others, the modified UWB packets may have a first configuration that includes a preamble having a higher power level than the preamble of a traditional UWB ranging packet. The modifications discussed in connection with FIG. 6 or FIG. 7 may be useful in the transmission of 908, e.g., because the increased transmit power of the modified packets, along with the omission of payload data, may result in an energy-efficient transmission that may be detected by the target device at a distance well beyond the functional range of normal UWB communications.

In some scenarios, the modified UWB packets (or some portion thereof, such as the preamble and/or SFD) may be coded, such as with an Ipatov sequence (e.g., length-127) or other spreading code. The source device may communicate code information (e.g., coding scheme, code sequence, etc.) to the target device (or vice versa), e.g., via the second RAT. Such coding may improve cross-correlation properties of the modified UWB packets, e.g., in an UWB multi-user environment, helping to reduce collisions with UWB packets from other sources.

In some scenarios, the source device may, at 908, begin transmitting modified UWB packets repeatedly (e.g., periodically, or at random time intervals). In some scenarios, the source device may communicate to the target device (e.g., via the second RAT) timing information (e.g., specific times, time intervals, etc.) regarding when the modified UWB packets will be transmitted. In other scenarios, such timing information may not be communicated.

At 808, the target device may receive the modified UWB packet from the source device. In some scenarios, the target device may also receive (e.g., via the second RAT) the timing information regarding when the modified UWB packets will be transmitted, and may listen for the modified UWB packets (e.g., only) at those times. For example, the target device may activate its UWB receiver at the times specified by the timing information, and may deactivate its UWB receiver at other times (e.g., enter a low-power state, stop processing received signals, etc.), e.g., to avoid collisions or otherwise disruptions resulting from signals from other UWB sources. This may help avoid errors and/or inefficiencies in UWB multi-user environments. In other scenarios, the target device may not receive the timing information, and/or may listen for the modified UWB packets at other times (e.g., continuously).

In response to receiving the modified UWB packet from the source device, the target device may, at 810, determine whether the signal quality of the modified UWB packet meets (e.g., is great than, or is equal-to-or-greater-than) a predetermined threshold value, DetectThreshold. For example, the signal quality may be, or include, signal strength, RSSI, SNR, packet error rate, etc. DetectThreshold may represent a threshold value indicating a minimum level of reliability of the received modified UWB packet, based on the signal quality of the packet.

If the signal quality of the modified UWB packet does not meet DetectThreshold, then the packet may be deemed unreliable, and may be ignored, and the target device may return to 808 to await a subsequent modified UWB packet (e.g., if the source device is sending modified UWB packets repeatedly at 908).

If the signal quality of the modified UWB packet does meet DetectThreshold, then the target device may, at 812, determine whether the signal quality of the modified UWB packet meets (e.g., is great than, or is equal-to-or-greaterthan) a second threshold value, UWBThreshold. UWB-Threshold may represent a signal quality threshold that corresponds to the (e.g., maximum) functional range of normal UWB communications (e.g., communications using normal packets, as opposed to modified packets as in FIG. 6 or FIG. 7). In other words, if the signal quality of the modified UWB packet meets UWBThreshold, then the target device is believed to be within the functional range of UWB communications with the source device.

If the signal quality of the modified UWB packet does not meet UWB Threshold, then the target device may, at 814, provide an output to guide the user toward the source device. For example, the target device may estimate an approximate distance to the source device, e.g., based on the signal quality of the received modified UWB packet, and/or based on ranging information from other sources, such as a BT ranging procedure. Additionally, or alternatively, the target device may determine a relative direction toward the source device, e.g., based on the angle of arrival of the received modified UWB packet. The output provided to the user may be in any format desired. For example, if the target device includes a graphical display, then the target device may display thereon an arrow or other indication of the direction toward the source device. In some scenarios, the target device may further display text (e.g., a number of feet) or graphical indicator (e.g., signal strength bars) indicating the estimated distance to the source device. Alternatively, or additionally, the target device may change the size, location, color, or other characteristic of the arrow (or other indicator) on the display to indicate the distance to the source device. In other scenarios, the output may include (or consist of) other indicators, such as sound(s), haptic feedback, blinking light(s), etc. In some scenarios, the output may include a prompt or instruction for the user to move and/or angle the target device toward the source device.

Upon providing the output, the target device may return to 808 to await a subsequent modified UWB packet (e.g., if the source device is sending modified UWB packets repeatedly at 908). Thus, the target device may update the output based on each subsequent modified UWB packet received (or some subset of the packets received), e.g., to provide a repeatedly, or continuously, updated report of the relative direction and/or distance of the source device. The user may be guided thereby in moving toward the source device.

If the signal quality of the modified UWB packet does meet UWBThreshold, then the target device may, at 816, transmit an indication to the source device that the target device is within the normal functional range for UWB communication with the source device. It should be understood that, because UWB communications may be highly directional, the normal functional range for UWB communications may be a function of both distance and directionality. Thus, in some scenarios, the target device may enter normal functional range of UWB communications either by moving closer to the source device, or by changing its orientation in the direction of the source device, or both. In some scenarios, the target device may transmit the indication via the second RAT. In other scenarios, the target device may transmit the indication via UWB communications, as the target device is now believed to be within the functional range of UWB communications. In some scenarios, the target device transmitting any UWB communication to the source device may serve as the indication that the target device is within the normal functional range for UWB communication with the source device, e.g., if the UWB communication is successfully received by the source device.

At 916, the source device may receive the indication that the target device is within the normal functional range for UWB communication with the source device. In response, the source device may stop its periodic transmission of the modified UWB packets, and may initiate a traditional ranging procedure. For example, the source device may, at 918, transmit to the target device an UWB ranging request message, such as a ranging packet.

At 818, the target device may receive the UWB ranging request message, and may respond, at 820, by transmitting an UWB ranging response message, e.g., after waiting a predetermined time delay following receipt of the UWB ranging request message.

At 920, the source device may receive the UWB ranging response message, and may determine, at 922, the distance between the source device and the target device, e.g., based on the time elapsed between transmission of the UWB ranging request message and receipt of the UWB ranging response message (which elapsed time may consist of the time of flight of the UWB ranging request message, the predetermined time delay at the target device, and the time of flight of the UWB ranging response message). The source device may also determine, at 922, a direction of the target device, e.g., based on the angle of arrival of the UWB ranging response message.

Following 922 (or included in 922), the source device may communicate, to the target device, information such as the distance between the target device and the source device, as determined at 922. Thus, the target device may receive the more precise/accurate UWB ranging information. The information may be communicated, e.g., via UWB communications, via the second RAT, etc. In other scenarios, a second ranging operation may be performed, e.g., following 922, initiated by the wireless device performing the method of FIG. 8 (e.g., the wireless device 104) transmitting an UWB ranging packet, thereby allowing that device to directly determine more precise/accurate UWB ranging information.

It should be understood that the elements illustrated in FIG. 8 and FIG. 9 are merely examples, and numerous variations are possible, wherein one or more elements may be added, omitted, or reordered. For example, in some scenarios, 804 may be omitted, and the target device may transmit, at 806, an instruction or request for the source device to begin transmitting the modified UWB packets, e.g., upon first detecting the presence of the source device, without any previous determination of whether the target device is within functional range of UWB communications with a source device. As another example, the method of FIG. 8 may begin at 808 (omitting both 804 and 806), e.g., if the source device has already initiated transmission of modified UWB packet(s), e.g., based on some other trigger. As yet another example, in some scenarios, 810 may be omitted, and the target device may proceed directly from 808 to 812, without testing whether the signal quality meets DetectThreshold.

As yet another example, some or all of 816-820 and/or 916-922 may be omitted (e.g., if the guidance provided at 814 guides the user of the target device sufficiently close to the source device that further ranging is not desired) and/or may be replaced with an alternative ranging procedure. For example, in some scenarios, the devices may switch roles, e.g. following 816 and 916, such that the wireless device performing the method of FIG. 8 (e.g., the wireless device 104) becomes the source device, and the wireless device performing the method of FIG. 9 (e.g., the wireless device 102) becomes in the target device. In such scenarios, the wireless device 104 may transmit the UWB ranging request message, receive the UWB ranging response message, and determine the location of the wireless device 102. The wireless device 102 may receive the UWB ranging request message and transmit the UWB ranging response message. Such scenarios may eliminate the need for the wireless device 102 (the original source device) to report the distance determined during the ranging procedure to the wireless device 104 (the original target device), as discussed in connection with 922, above. Instead, the wireless device 104 (the original target device) may directly determine the distance between the wireless device 104 and the wireless device 102, by performing the ranging procedure.

Other variations of the illustrated methods are also envisioned.

Example Embodiments

The following represent examples of the principles disclosed.

A wireless communication device may perform a method to locate a target device. The method may include transmitting a first packet according to a first radio access technology (RAT), the first packet having a first configuration including a preamble having a first energy level; receiving an indication via a second RAT that the target device is within normal communication range according to the first RAT; transmitting a second packet according to the first RAT, in response to receiving the indication, the second packet having a second configuration including a preamble having a second energy level, lower than the first energy level; receiving a ranging response message responsive to the second packet; and determining a distance between the wireless communication device and the target device, based on the received ranging response message.

In some scenarios, the wireless communication device may provide the location to the target device.

In some scenarios, the second packet may include a data payload portion, wherein the first packet omits the data payload portion. In some scenarios, the first packet may consist of a preamble and a start frame delimiter.

In some scenarios, the second energy level may be lower than the first energy level as a result of the first preamble having higher instantaneous transmit power than the second preamble. In some scenarios, the second energy level may be lower than the first energy level as a result of the first preamble having a longer time duration than the second preamble.

In some scenarios, transmitting the first packet having the first configuration may be in response to receiving an indication via the second RAT that the target device is outside normal communication range of the first RAT.

In addition to the above-described exemplary embodiments, further embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a wireless device 102 or 104) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A wireless communication device, comprising:
a first radio configured to perform communications according to a first radio access technology (RAT);
a second radio configured to perform communications according to a second RAT;
at least one processor communicatively coupled to the first radio and the second radio, the at least one processor configured to cause the wireless communication device to:
receive, via the first radio, a first packet, having a first configuration;
determine that a received signal quality of the first packet meets a predetermined threshold;
in response to the determining, transmit, via the second radio, an indication that the wireless communication device is within normal communication range of a source device according to the first RAT; and
receive, via the first radio, a second packet, responsive to the indication that the wireless communication device is within normal communication range of the source device, the second packet having a second configuration, different from the first configuration, wherein a packet preamble configured according to the second configuration has a lower power level than a preamble configured according to the first configuration.

2. The wireless communication device of claim 1, wherein the second packet is a ranging packet, wherein the at least one processor is further configured to cause the wireless communication device to:
transmit a ranging response message in response to the second packet.

3. The wireless communication device of claim 1, wherein the at least one processor is further configured to cause the wireless communication device to:
receive, via the first radio, a third packet, prior to receiving the first packet, the third packet having the first configuration; and
in response to receiving the third packet, provide an output indicating an estimated location of the source device, the output indicating at least one of an estimated direction or an estimated distance from the wireless communication device to the source device.

4. The wireless communication device of claim 3, wherein the at least one processor is further configured to cause the wireless communication device to:
 determine an angle of arrival of the third packet, wherein the estimated direction indicated by the output is based on the determined angle of arrival.

5. The wireless communication device of claim 3, wherein the at least one processor is further configured to cause the wireless communication device to:
 receive, via the first radio, a plurality of packets having the first configuration; and
 provide an updated output indicating an estimated location of the source device, in response to each packet of the plurality of packets.

6. The wireless communication device of claim 1, wherein the first configuration comprises at least a preamble of a packet being encoded with a spreading code.

7. The wireless communication device of claim 6, wherein the at least one processor is further configured to cause the wireless communication device to:
 receive, via the second radio, code information regarding the spreading code.

8. The wireless communication device of claim 1, wherein the at least one processor is further configured to cause the wireless communication device to:
 receive, via the second radio, timing information indicating when packets having the first configuration will be transmitted; and
 listen for the packets having the first configuration at one or more times based on the timing information, wherein the first radio is disabled at other times.

9. A method of locating a wireless communication device, the method comprising:
 by a wireless communication device:
  receiving from a source device a first packet according to a first radios access technology (RAT), the first packet having a first configuration;
  determining that a received signal quality of the first packet meets a predetermined threshold;
  in response to the determining, transmitting, according to a second RAT, an indication that the wireless communication device is within normal communication range of the source device according to the first RAT; and
  receiving from the source device a second packet, responsive to the indication that the wireless communication device is within normal communication range of the source device, the second packet having a second configuration, different from the first configuration, wherein a packet preamble configured according to the second configuration has a lower power level than a preamble configured according to the first configuration.

10. The method of claim 9, wherein the second packet is a ranging packet, the method further comprising:
 transmitting a ranging response message in response to the second packet.

11. The method of claim 9, further comprising:
 receiving a third packet, prior to receiving the first packet, the third packet having the first configuration; and
 in response to receiving the third packet, providing an output indicating an estimated location of the source device, the output indicating at least one of an estimated direction or an estimated distance from the wireless communication device to the source device.

12. The method of claim 11, further comprising:
 determining an angle of arrival of the third packet, wherein the estimated direction indicated by the output is based on the determined angle of arrival.

13. The method of claim 11, further comprising:
 receiving from the source device a plurality of packets according to the first RAT, each packet of the plurality of packets having the first configuration; and
 providing an updated output indicating an estimated location of the source device, in response to each packet of the plurality of packets.

14. The method of claim 9, wherein the first configuration comprises at least a preamble of a packet being encoded with a spreading code.

15. The method of claim 14, further comprising:
 receiving, via the second RAT, code information regarding the spreading code.

16. The method of claim 9, further comprising:
 receiving, via the second RAT, timing information indicating when packets having the first configuration will be transmitted; and
 listening for the packets having the first configuration at one or more times based on the timing information, wherein a receiver for receiving signals according to the first RAT is disabled at other times.

17. A wireless communication device comprising:
 a first radio configured to perform communications according to a first radio access technology (RAT);
 a second radio configured to perform communications according to a second RAT;
 at least one processor communicatively coupled to the first radio and the second radio, the at least one processor configured to cause the wireless communication device to:
  transmit, via the first radio, a first packet having a first configuration, the first configuration including a preamble having a first energy level;
  receive, via the second radio, an indication that a target device is within normal communication range according to the first RAT;
  transmit, via the first radio, in response to receiving the indication, a second packet having a second configuration, the second configuration including a preamble having a second energy level, lower than the first energy level;
  receive, via the first radio, a ranging response message responsive to the second packet; and
  determine a distance between the wireless communication device and the target device, based on the received ranging response message.

18. The wireless communication device of claim 17, wherein the second configuration includes a data payload portion, wherein the first configuration omits the data payload portion.

19. The wireless communication device of claim 17, wherein the second energy level is lower than the first energy level as a result of at least one of:
 the first preamble having higher instantaneous transmit power than the second preamble; or
 the first preamble having a longer time duration than the second preamble.

20. The wireless communication device of claim 17, wherein the at least one processor is further configured to cause the wireless communication device to:
 receive, via the second radio, an indication that the target device is outside normal communication range of the first RAT, wherein transmitting the first packet having the first configuration is in response to receiving the indication.

* * * * *